United States Patent [19]

Kim

[11] Patent Number: 5,045,944
[45] Date of Patent: Sep. 3, 1991

[54] VIDEO SIGNAL GENERATING CIRCUIT FOR USE IN VIDEO TAPE RECORDER AND TELEVISION RECEIVER

[75] Inventor: Yong-Je Kim, Jinhae, Rep. of Korea

[73] Assignee: Samsung Electronics Co., Ltd., Suwon, Rep. of Korea

[21] Appl. No.: 292,354

[22] Filed: Dec. 30, 1988

[30] Foreign Application Priority Data

Dec. 30, 1987 [KR] Rep. of Korea ............... 1987-15390

[51] Int. Cl.$^5$ ...................... H04N 5/14; H04N 9/74; H04N 5/262
[52] U.S. Cl. ................................. 358/160; 358/22; 358/183
[58] Field of Search ................ 358/22, 160, 183; 340/724; 364/520, 521

[56] References Cited

U.S. PATENT DOCUMENTS

| | | | |
|---|---|---|---|
| 3,943,280 | 3/1976 | Kimura et al. | 358/183 |
| 4,139,860 | 2/1979 | Micic et al. | 358/22 |
| 4,249,213 | 2/1981 | Imaide et al. | 358/183 |
| 4,612,569 | 9/1986 | Ichinose | 358/22 |
| 4,623,915 | 11/1986 | Bolger | 358/22 |
| 4,698,664 | 10/1987 | Nichols et al. | 358/10 |
| 4,746,983 | 5/1988 | Hakamada et al. | 358/183 |
| 4,774,582 | 9/1988 | Hakamada et al. | 358/22 |
| 4,796,089 | 1/1989 | Imai et al. | 358/22 |
| 4,814,884 | 3/1989 | Johnson et al. | 358/183 |
| 4,855,813 | 8/1989 | Russell et al. | 358/183 |

FOREIGN PATENT DOCUMENTS

56-27573 3/1981 Japan.

OTHER PUBLICATIONS

Ullrich et al., *Electronics*, pp. 102–106, Sep. 1, 1977.
Masuda et al., *IEEE Transactions on Consumer Electronics*, vol. CE, pp. 152–158, Feb. 25, 1979.

*Primary Examiner*—John W. Shepperd
*Assistant Examiner*—Michael Parker
*Attorney, Agent, or Firm*—Fleit, Jacobson, Cohn, Price, Holman & Stern

[57] ABSTRACT

A sub-screen generator used in displaying a single or a plurality of sub-screens concurrently with a main screen when reproducing video signals on TV. The sub-screen generator includes a microcomputer for producing ON/OFF signals to enable or disable a sub-screen and a plurality of signals including a signal directing a start position of the present sub-screen; a destination location decoder coupled to the microcomputer for decoding a destination location of the sub-screen on the main screen and generating control signals; a first register for storing row starting locations of a plurality of sub-screens; a second register for storing column starting locations of said sub-screens; first and second multiplexers which respectively receive the control signals of said destination location decoder and the data according to the row and column starting locations of said registers, and therefrom deliver each output to third and fourth registers; the third and fourth registers respectively provide the starting location data from the multiplexers the adjusting means providing starting location data for display, as output signals at respective output terminals, output terminals providing the output signals as feedback data to the third and fourth registers, respectively offset stages for providing control deviation data to the adjusting means to be added to or subtracted from the feedback data to produce further output signals at respective outputs for display and feedback, thereby adjusting the row and column position thereby adjusting the row and column of the sub-screens; and a counter which generates a signal for controlling the period of the data applied from the registers to the adjusting means.

24 Claims, 1 Drawing Sheet

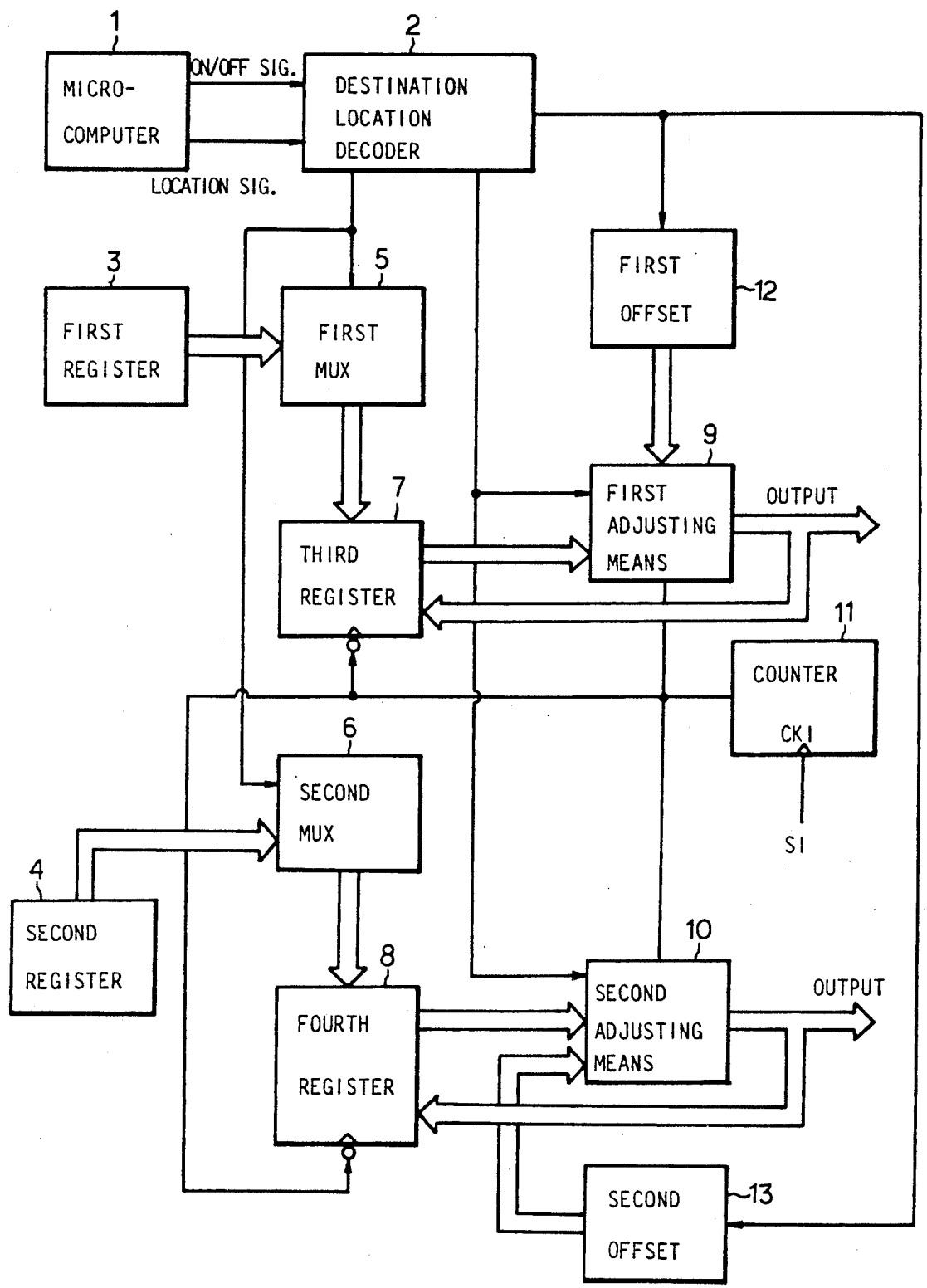
FIGURE

VIDEO SIGNAL GENERATING CIRCUIT FOR USE IN VIDEO TAPE RECORDER AND TELEVISION RECEIVER

BACKGROUND OF THE INVENTION

The present invention relates to a video signal generating circuit for use in a video tape recorder (VTR) and a television receiver (TV), and in particular, a sub-screen generator used in displaying a single or a plurality of sub-screens concurrently with a main screen when reproducing video signals on TV, as if spreading cards of the sub-screens on the main screen thereof.

In displaying a sub-screen superposed on a main picture by utilizing a conventional picture-in-picture (PIP) technology, the display position of the sub-screen is always fixed to a specific direction or location predetermined on the main screen of the TV.

OBJECT OF THE INVENTION

An object of the present invention is to provide a sub-screen generator being capable of changing the display position in displaying a single or a plurality of sub-screens concurrently with a main screen when reproducing video signals on a video output device, as if spreading cards of the sub-screens on the main screen thereof.

SUMMARY OF THE INVENTION

To achieve the object of the invention, the sub-screen generator according to the present invention may include:
- a microcomputer for producing ON/OFF signals to enable or disable a sub-screen and a plurality of signals including a signal directing a start position of the present sub-screen;
- a destination location decoder coupled to the microcomputer for decoding a destination location of the sub-screen on the main screen and generating control signals;
- a first register for storing row starting locations of a plurality of sub-screens;
- a second register for storing column starting locations of said sub-screens;
- first and second multiplexers which respectively receive the control signals of said destination location decoder and the data according to the row and column starting locations of said registers, and therefrom deliver each output to third and fourth registers;
- the third and fourth registers wherein, at the starting location of the sub-screen, the data from the multiplexers are respectively applied to first and second adjusting means to add or subtract the row and column starting locations of the sub-screens, and during processing the sub-screens, a feedback of output data is carried out with said first and second adjusting means, respectively;
- the first and second adjusting means for receiving the row and column starting data of the sub-screens displayed on the main screen from the registers, and receiving the output data indicative of the control deviation of addition and subtraction with respect to the row and column being applied from the offset means, thereby adjusting the row and column of the sub-screens; and
- a counter which generates a signal for controlling the period of the data applied from the multplexers to the adjusting means.

BRIEF DESCRIPTION OF THE DRAWING

A FIGURE shows a block diagram of a preferred embodiment of the sub-screen generator according to the present invention.

DETAILED DESCRIPTION OF THE INVENTION

The present invention will be described in detail hereinafter by way of example only with reference to the accompanying drawing. Referring now to the FIGURE, the sub-screen generator according to the present invention includes a microcomputer 1 for producing ON/OFF signals to enable or disable a sub-screen and a plurality of signals including a signal directing a start position of the present sub-screen; a destination location decoder 2 coupled to the microcomputer 1 for decoding a destination location of the sub-screen on the main screen and generating control signals; a first register 3 for storing row starting locations of a plurality of sub-screens; a second register 4 for storing column starting locations of said sub-screens; first and second multiplexers 5 and 6 which respectively receive the control signals of said destination location decoder 2 and the data according to the row and column starting locations of said registers 3 and 4, and therefrom deliver each output to third and fourth registers 7 and 8; the third and fourth registers 7 and 8 wherein, at the starting location of the sub-screen, the data from the multiplexers 5,6 are respectively applied to first and second adjusting means 9 and 10 to add or subtract the row and column starting locations of the sub-screens, and during processing the sub-screens, a feedback of output data is carried out with said first and second adjusting means, respectively; the first and second adjusting means 9 and 10 for receiving the row and column starting data of the sub-screens displayed on the main screen from the registers 7 and 8, and receiving the output data indicative of the control deviation of addition and subtraction with respect to the row and column being applied from the offset means 12 and 13, thereby adjusting the row and column of the sub-screens; and a counter 11 which generates a signal for controlling the period of the data applied from the registers 7 and 8 to the adjusting means 9 and 10.

When the sub-screen ON/OFF signal and the location signal of the present sub-screen are available from the microcomputer 1 to which a sub-screen ON signal is applied, the destination location decoder 2 produces a control signal after decoding the destination location of a sub-screen to be located on a main screen in a PIP system. When the destination location decoder 2 outputs the control signal for controlling the row and column starting location of the sub-screen respectively to the multiplexers 5 and 6, each multiplexer 5,6 applies to each register 7,8 eight-bit data corresponding to said control signal i.e., eight-bit data received from each register 3,4 corresponding to said control signal from decoder 2 from each register 3, 4. A counter 11 upon which a vertical synchronizing signal S1 of the sub-screen is applied to its clock terminal CK1, counts the vertical synchronizing signal S1 of the sub-screen and thereby outputs a pulse of logic HIGH level at every sixteenth vertical synchronizing signal to the registers 7, 8 and to the adjusting means 9, 10. Therefore, there is controlled a period of the data applied from the registers 7, 8 to the adjusting means 9, 10.

When the data applied from the multiplexers 5, 6 become a first starting location of the sub-screen, the registers 7, 8 output the data received from the multiplexers 5, 6 to the first and second adjusting means without any change. Whereas, during processing the sub-screen, the registers 7, 8 return the data from the adjusting means 9, 10, thereby making a feedback of output data.

At this moment, the counter 11 controls the period of the data applied from the registers 7, 8 to the adjusting means 9, 10, whereas the period of data transfer is determined by the sixteen synchronizing signals of the main screen. The first adjusting means 9 adds and subtracts the row starting data of the sub-screen to be displayed on the main screen applied from the register 7, and the data according to the control deviation of adjustment in the row applied from the offset section 12, while the second adjusting means 10 adds and substracts the data with respect to the column. The destination location decoder 2 applies to the offset sections 12, 13 a control signal for correcting the control deviation of the addition or the subtraction, and at the same time, applies to the adjusting means 9, 10 the data concerning whether to do addition or subtraction. The time that adds and subtracts the data of the adjusting means 9, 10 is controlled by the counter 11.

Therefore, the data produced from the first and second adjusting means 9, 10 become the start address of the sub-screen displayed on a main screen, and as the position of the sub-screen moves at every sixteenth horizontal synchronizing signal, a viewer of TV is presented with a view seen as if spreading cards of the sub-screens on the main screen thereof.

According to the present invention, the sub-screen displayed like cards being sequentially spread open on a main screen in a PIP feature TV or VTR can be obtained by only adding a single sub-screen generator within a conventional PIP controller, so that an improved function more than the simple PIP function can be enjoyed by its viewer.

What is claimed is:

1. A sub-screen generator, comprising:
a microcomputer for producing ON/OFF signals to enable or disable a sub-screen and a plurality of signals including a signal directing a start position of a current sub-screen;
a destination location decoder coupled to the microcomputer for decoding a destination location of the current sub-screen on the main screen and generating control signals;
a first register for storing row starting locations of a plurality of sub-screens;
a second register for storing column starting locations of said sub-screens;
first and second multiplexers respectively receiving the control signals of said destination location decoder and input data defining the row and column starting locations of said first and second registers, and therefrom deliver each output to third and fourth registers;
the third and fourth registers respectively providing the starting location data from the multiplexers to first and second adjusting means;
the first and second adjusting means providing as output signals said starting location data for display, at respective output terminals, said respective output terminals providing said output signals as feedback data to said third and fourth registers, respectively;
offset means for providing deviation data to said adjusting means, to be added to or subtracted from said feedback data to produce further output signals of said respective outputs for display and feedback, thereby adjusting the row and column positions; and
counter means for generating a signal for controlling the period of the data applied from the registers to the adjusting means.

2. A sub-screen generator, comprising:
a microcomputer for producing ON/OFF signals to enable or disable a display of a sub-screen upon a main screen and a plurality of signals including a signal directing a start position of a current sub-screen;
a destination location decoder coupled to the microcomputer for decoding a destination location of the current sub-screen on the main screen and generating control signals;
a first register for storing row starting locations of a plurality of sub-screens;
a second register for storing column starting locations of said sub-screens;
first and second multiplexers respectively receiving the control signals of said destination location decoder and input data defining the row and column starting locations of said first and second registers, and from said input data delivering starting location output data corresponding to said control signals;
third and fourth registers respectively providing the starting location data from the multiplexers;
first and second adjusting means for receiving the starting location data from said third and fourth registers, respectively, for providing as output signals said starting location data for display, at respective output terminals, and for providing said output signals as feedback data to said third and fourth registers, respectively, at said output terminals; and
offset means for providing deviation data to said adjusting means, to be used to modify said starting location data to produce further output signals to said respective output terminals for display and feedback, and thereby adjusting the row and column positions.

3. The sub-screen generator of claim 2, further comprising said offset means being coupled to said location decoder and providing said deviation data in dependence upon said control signals.

4. The sub-screen generator of claim 2, further comprised of means for controlling the period of application of said starting location output data by said third and fourth registers to said first and second adjusting means, in synchronism with display of said main screen.

5. A sub-screen generator, comprising:
locating means for providing control signals representing start positions of a plurality of sub-screens to be located on a main screen and deviation between a start position of a current sub-screen and a destination location;
means for generating row starting addresses from among a plurality of row starting addresses, and column starting addresses from among a plurality of column starting addresses, in dependence upon said control signals; and output means for receiving said control signals and said row and column starting addresses, for performing incremental modification of said row and column starting addresses, and for generating row and column output addresses for subsequent sub-screens corresponding to said control signals.

6. The sub-screen generator of claim 5, wherein said output means comprises:
- first memory means for storing said row and column starting addresses and said row and column output addresses; and
- adjusting means coupled to said first memory means, for responding to said control signals by performing said incremental modification of said row and column addresses.

7. The sub-screen generator of claim 5, wherein said output means comprises:
- offset means receiving said control signals, for providing output data indicative of deviation between said start position and destination location;
- first memory means for storing said row and column starting addresses and said row and column output addresses; and
- adjusting means coupled to said first memory means, for responding to said output data by performing said incremental modification of said row and column addresses, and providing incrementally modified row and column addresses to said first memory means as said row and column output addresses.

8. The sub-screen generator of claim 5, wherein said locating means provides a first of said control signals representing said start positions, a second of said control signals representing said deviation, and a third of said control signals representing a mode of performing said incremental modification.

9. The sub-screen generator of claim 5, wherein said generating means comprises:
- first memory means for storing said plurality of row and column starting locations; and
- means for selecting between said plurality of row and column starting locations in response to said control signals, to provide said row and column starting addresses.

10. The sub-screen generator of claim 8, wherein said generating means comprises:
- first memory means for storing said plurality of row and column starting locations; and
- means for selecting between said plurality of row and column starting locations in response to said first of said control signals, to provide said row and column starting addresses.

11. The sub-screen generator of claim 8, wherein said output means comprises:
- first memory means for storing said row and column starting addresses and said row and column output addresses; and
- adjusting means coupled to said first memory means, for responding to said control signals by performing said incremental modification of said row and column addresses in response to said third of said control signals.

12. The sub-screen generator of claim 8, wherein said output means comprises:
- offset means receiving said second of said control signals, for providing output data controlling modification of said row and column starting addresses in dependence upon said second of said control signals;
- first memory means for storing said row and column starting addresses and said row and column output addresses; and
- adjusting means coupled to said first memory means, for responding to said output data by performing said incremental modification of said row and column addresses in accordance with said third of said control signals, and providing incrementally modified row and column addresses to said first memory means as said row and column output addresses.

13. The sub-screen generator of claim 10, wherein said output means comprises:
- second memory means receiving said row and column addresses from said selecting means, for storing said row and column starting addresses and said row and column output addresses; and
- adjusting means coupled to said second memory means, for performing said incremental modification of said row and column addresses in response to said third of said control signals.

14. The sub-screen generator of claim 10, wherein said output means comprises:
- offset means receiving said second of said control signals, for providing output data controlling modification of said row and column starting addresses in dependence upon said second of said control signals;
- second memory means for storing said row and column starting addresses and said row and column output addresses; and
- adjusting means coupled to said first memory means, for responding to said output data by performing said incremental modification of said row and column addresses in accordance with said third of said control signals, and providing incrementally modified row and column addresses to said first memory means as said row and column output addresses.

15. The sub-screen generator of claim 7, further comprising means for controlling a period of application of said starting addresses by said first memory means to said adjusting means, in synchronism with video display of said main screen.

16. A sub-screen generator, comprising:
- a microcomputer for producing ON/OFF signals to enable or disable a display of a sub-screen upon a main screen and a plurality of signals including a signal directing a start position of a current sub-screen;
- a destination location decoder coupled to the microcomputer for decoding a destination location of the current sub-screen on the main screen and generating control signals;
- first memory means for storing column starting locations of a plurality of sub-screens;
- a multiplexer respectively receiving the control signals of said destination location decoder and input data defining the column starting locations of said first memory means, and from said input data delivering starting location output data corresponding to said control signals;
- second memory means for storing the starting location data from the multiplexer;
- adjusting means for receiving the starting location data from said second memory means, for providing as output signals said starting location data for display, at an output terminal, and for providing said output signals as feedback data to said second memory means, at said output terminal; and offset means for providing deviation data to said adjusting means, to be added to or subtracted from said feedback data to produce further output signals at said output terminal for display and feedback, and thereby adjusting the column positions.

17. The sub-screen generator of claim 16, further comprising said offset means being coupled to said location decoder and providing said deviation data in dependence upon said control signals.

18. The sub-screen generator of claim 16, further comprised of means for controlling the period of application of said starting location output data by said second memory means to said adjusting means, in synchronism with display of said main screen.

19. A sub-screen generator, comprising:

a microcomputer for producing ON/OFF signals to enable or disable a display of a sub-screen upon a main screen and a plurality of signals including a signal directing a start position of a current sub-screen;

a destination location decoder coupled to the microcomputer for decoding a destination location of the current sub-screen on the main screen and generating control signals;

first memory means for storing column starting locations of a plurality of sub-screens;

a multiplexer respectively receiving the control signals of said destination location decoder and input data defining the column starting locations of said first memory means, and from said input data delivering starting location output data corresponding to said control signals;

second memory means for storing the starting location data;

adjusting means for receiving the starting location data from said second memory means, for providing as output signals said starting location data for display, at an output terminal, and for providing said output signals as feedback data to said second memory means, at said output terminal; and offset means for providing deviation data to said adjusting means, to be used to modify said starting ata to produce further output signals at said output terminal for display and feedback, and thereby adjusting the column positions.

20. The sub-screen generator of claim 19, further comprising said offset means being coupled to said location decoder and providing said deviation data in dependence upon said control signals.

21. The sub-screen generator of claim 19, further comprised of means for controlling the period of application of said starting location output data by said second memory means to said adjusting means, in synchronism with display of said main screen.

22. A process for generating a video sub-screen, comprising:

enabling a display of a sub-screen upon a main screen and a generating a plurality of signals including a signal directing a start position of a current sub-screen;

decoding from said plurality of signals, a destination location of the current sub-screen on the main screen and generating control signals;

storing row starting locations of a plurality of sub-screens;

storing column starting locations of said sub-screens;

generating starting location output data corresponding to said control signals from input data defining said plurality of row starting locations and said plurality of column starting locations;

storing said starting location data;

providing said starting location data as output signals for display, at respective output terminals, performing incremental modification of said starting location data, and providing said output signals at said output terminals as feedback data to replace said starting location data; and providing deviation data to enable said incremental modification of said starting location data to produce said output signals at said respective output terminals for display and feedback, and thereby adjusting the row and column positions of said sub-screen upon said main screen.

23. The process of claim 22, further comprised of providing said deviation data in dependence upon said control signals.

24. The sub-screen generator of claim 22, further comprised of reading said starting location output data for said incremental modification, in synchronism with display of said main screen.

* * * * *

UNITED STATES PATENT AND TRADEMARK OFFICE
CERTIFICATE OF CORRECTION

PATENT NO. : 5,045,944

DATED : September 3, 1991

INVENTOR(S) : Yong-Je Kim

It is certified that error appears in the above-indentified patent and that said Letters Patent is hereby corrected as shown below:

Column 7, claim 19, line 48, change "ata" to —data—.

Signed and Sealed this

Twenty-third Day of May, 1995

Attest:

BRUCE LEHMAN

Attesting Officer

Commissioner of Patents and Trademarks